(12) United States Patent
Pusheck

(10) Patent No.: US 10,788,341 B2
(45) Date of Patent: Sep. 29, 2020

(54) SPRING CLIP FOR SENSOR MOUNTING

(71) Applicant: Autoliv ASP, Inc., Ogden, UT (US)

(72) Inventor: Jacob Pusheck, Waterford, MI (US)

(73) Assignee: AUTOLIV ASP, INC., Southfield, MI (US)

( * ) Notice: Subject to any disclaimer, the term of this patent is extended or adjusted under 35 U.S.C. 154(b) by 170 days.

(21) Appl. No.: 15/788,780

(22) Filed: Oct. 19, 2017

(65) Prior Publication Data

US 2019/0120668 A1    Apr. 25, 2019

(51) Int. Cl.
  *G01D 11/30*    (2006.01)
(52) U.S. Cl.
  CPC ................... *G01D 11/30* (2013.01)
(58) Field of Classification Search
  USPC .......................................... 73/866.5
  See application file for complete search history.

(56) References Cited

U.S. PATENT DOCUMENTS

| | | | |
|---|---|---|---|
| 5,945,606 A * | 8/1999 | Tokunaga | B60C 23/04 374/E1.018 |
| 6,354,153 B1 | 3/2002 | Weiblen et al. | |
| 7,522,474 B2 | 4/2009 | Nakajima et al. | |
| 8,695,422 B2 | 4/2014 | Kawashima et al. | |
| 2012/0247179 A1 | 10/2012 | Kerin et al. | |
| 2016/0139168 A1 | 5/2016 | Ludwig et al. | |

FOREIGN PATENT DOCUMENTS

JP    2011-196946 A    10/2011

OTHER PUBLICATIONS

International Search Report for International Application No. PCT/US2018/056264, dated Jan. 8, 2019, 3 pgs.

* cited by examiner

*Primary Examiner* — Daniel S Larkin
(74) *Attorney, Agent, or Firm* — Dickinson Wright PLLC

(57) ABSTRACT

A mountable sensor assembly for mounting on the sheet metal of a vehicle assembly. The sheet metal may have an opening for mounting the mountable sensor assembly. The mountable sensor assembly may include a sensor circuit, a sensor housing with a mounting post, and a clip. The sensor housing may include a cavity that receives the sensor circuit. The sensor housing may include a mounting surface and a mounting post extending from the mounting surface. The mounting post may include a gap allowing the diameter of the post to expand and contract. A clip is configured to lock onto the mounting post and extend into the gap to expand a perimeter of the mounting post. By expanding the perimeter, the mounting post is locked through the opening in the sheet metal.

18 Claims, 7 Drawing Sheets

SPRING CLIP FOR SENSOR MOUNTING

BACKGROUND

The present application relates generally to a sensor assembly with a spring clip for locking a mounting post.

BRIEF SUMMARY

In satisfying the above need, as well as overcoming the enumerated drawbacks and other limitations of the related art, the present application provides a sensor assembly with a spring clip for locking a mounting post.

The mountable sensor assembly is configured for being fixed to the sheet metal of a vehicle assembly. The sheet metal may have an opening for mounting the mountable sensor assembly. The mountable sensor assembly may include a sensor circuit, a sensor housing with a mounting post, and a clip. The sensor housing may include a cavity that receives the sensor circuit. The sensor housing may include a mounting surface and a mounting post extending from the mounting surface. The mounting post may include a gap allowing the diameter of the post to increase and decrease. A clip may be configured to lock onto the mounting post and extend into the gap to expand a perimeter of the mounting post. By expanding the perimeter, the mounting post may be locked through the opening in the sheet metal. The use of a mounting post allows removal of the bushing and bolt that are typically used for mounting this type of device. Removing the bushing and bolt can make the sensor assembly lighter, more cost effective, and easier to assemble.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

In the accompanying drawings the components are not necessarily to scale, emphasis instead being placed upon illustrating the principles of the application. Moreover, like reference numerals designate corresponding parts throughout the views.

DETAILED DESCRIPTION

Currently there is a strong push to reduce the overall cost of crash sensor assemblies. One of the major cost drivers with the sensor assemblies is currently the integrated metal bushing. This is a cost driver for two major reasons, the first being the material cost and machining cost of the retention bushing, and secondly that the injection over-molded bushing necessitates working with a more specific (and expensive) manufacturing company to produce the housing. Removing the bushing all together would completely negate the cost of the current metal bushing, as well as, allow producers to source the housing production to a wider range of manufacturers with a much lower overall cost. The implementations disclosed include a retention feature that provides a retention force over life of the sensor to the vehicle sheet metal. This is achieved by integrating a spreadable retention post with a clip to provide the spreading force.

The retention post may utilize various features described in more detail below including a barbed cantilever, a ratcheting interface, and a pocket for spring clip retention. The retention post may be made of a plastic material and provide a retention force between housing and the sheet metal. A spring clip may snap around the outer diameter of the retention post and include a plunger that extends into a gap in the retention post to provide an outward force on the inner features of the retention post. The outward force causes an interference of the retention post barbs with the vehicle sheet metal. The plunger may include a barb in the center to allow for a ratcheting fit of the clip into the retention post. The spring clip may be fed through a slot in the housing. The slot may be designed such that the clip only fits through the slot in one orientation. A shoulder feature in the slot can aid the operator in determining if the clip is fully inserted. For example, if the clip is flush with the shoulder the insertion may be proper. Further, a shoulder in the clip may interfere with the slot to prevent over insertion. The implementations described may be particularly effective when used in accelerometer based and pressure based crash sensors on motor vehicles.

Figure 1:
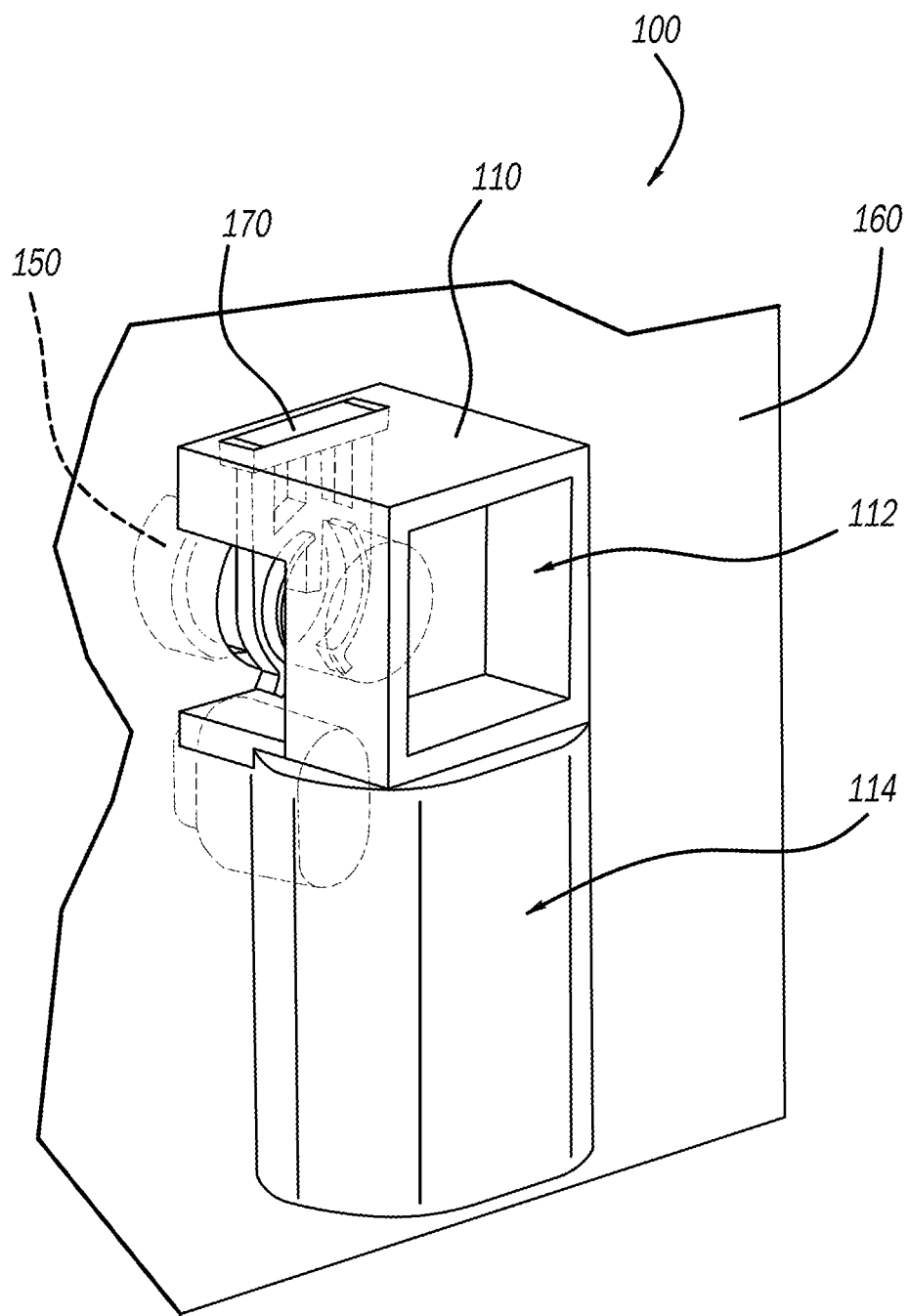
FIG. 1 is a perspective view of a sensor assembly with a spring clip for locking a mounting post.
Figure 2:
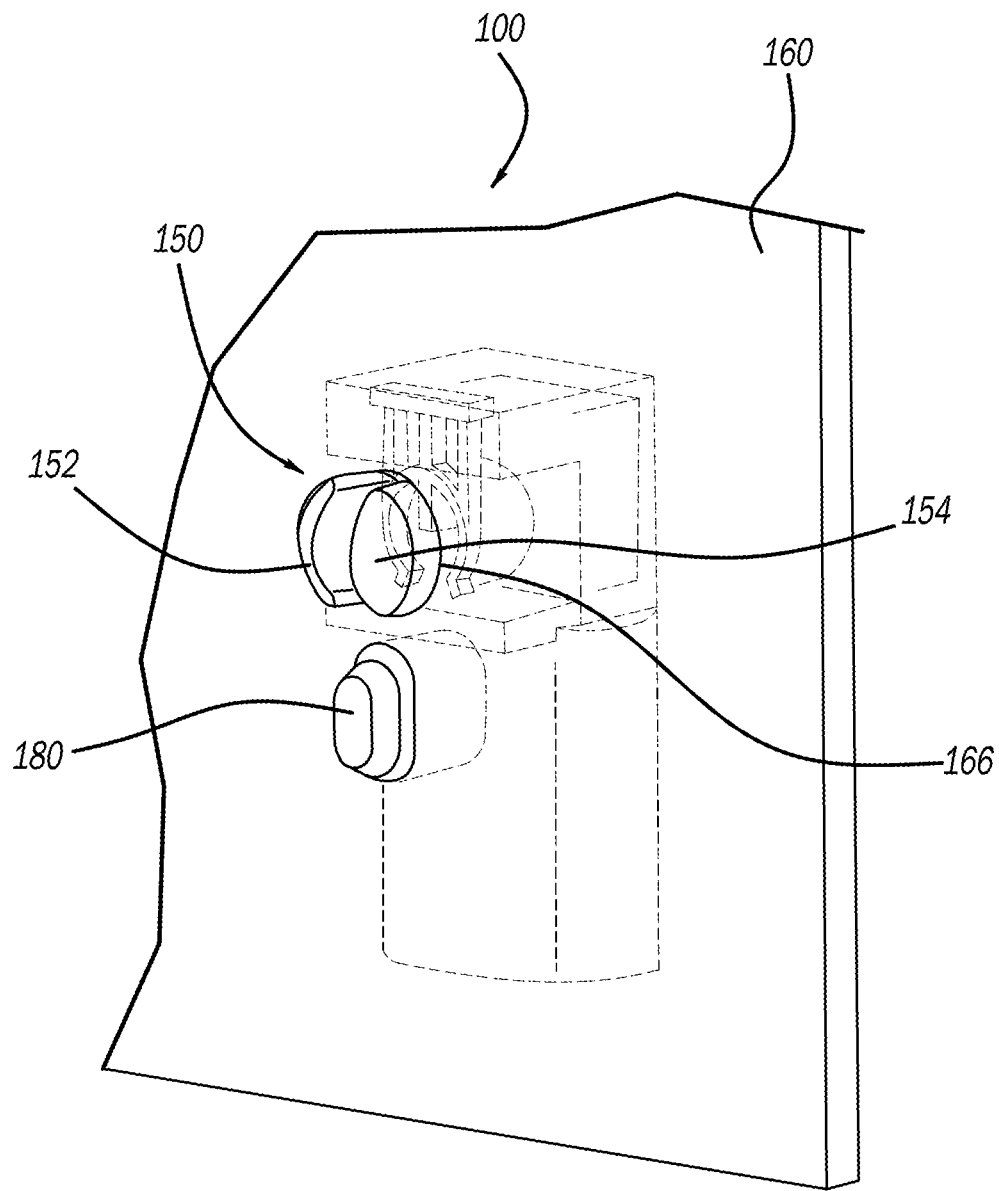
FIG. 2 is another perspective view of the sensor assembly from FIG. 1.
Figure 3:
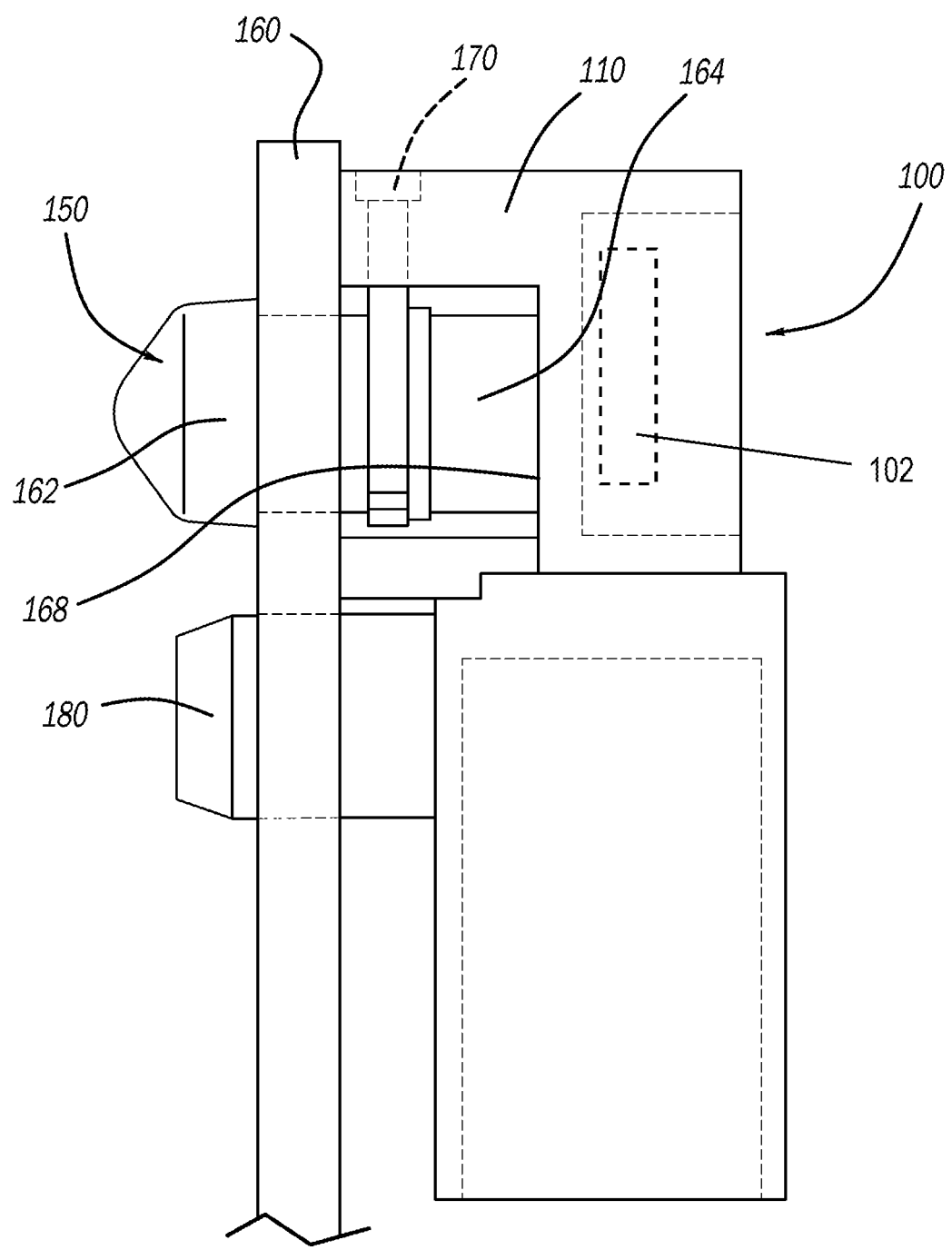
FIG. 3 is a side view of the sensor assembly from FIG. 1.

FIG. 1 and FIG. 2 are perspective views and FIG. 3 is a side view of a sensor assembly 100 attached to sheet metal. The sensor assembly 100 may include a housing 110. The housing 110 may be formed of a plastic material and may, for example, be injection molded. The housing 110 may include a cavity 112 and a connector 114. The cavity 112 may receive a sensor 102, for example an accelerometer, pressure sensor, or gyroscope. The sensor may be located and secured within the cavity 112 by various retaining features. The sensor 102 may be a single silicon chip. However, in some implementations, sensor 102 may include a packaged chip or include a printed circuit board (PCB).

The cavity 112 may be filled with a potting. The potting may be made of a non-conductive material that may be applied in liquid form and hardened or solidified to reinforce the position of the components within the cavity 112, as well as, prevent any electrical shorts or faults within the sensor assembly 100. A cover may be provided to seal the cavity 112 protecting the components within the cavity 112 from external conditions.

The sensor assembly 100 may also include a post 150 extending from the housing 110. In some implementations, the post 150 may extend from a portion of the housing 110 adjacent to the cavity 112. The housing 110 may include a mounting surface 168 and the post 150 extending from the mounting surface 168. The post 150 may extend from the housing 110 in a direction perpendicular to the connector 114. The post may be formed of multiple portions. In one example, the post may be formed of two portions with a gap extending between the two portions 152, 154. The post 150 may be configured to extend from the housing 110 through an opening 166 in the sheet metal 160. The post 150 may be configured to lock into place against the edges of the opening 166 in the sheet metal 160. In some implementations, the first portion 152 may deflect relative to a second portion 154, such that the portions may be deflected towards each other allowing the post 150 to pass through the opening 166 and then deflect away from each other to engage the edges of the opening 166 once the post 150 has extended through the sheet metal 160.

A clip 170 may be configured to extend into the gap between the first portion 152 and the second portion 154 after the post has been extended through the opening 166 in the sheet metal 160. Inserting the clip 170 into the post 150 deflects the first portion 152 away from the second portion 154, thereby, engaging the edges of the opening 166 in the sheet metal 160. The sensor assembly 100 may also include a tab 180 extending from the housing 110 through a second opening in the sheet metal 160. The tab 180 may fix the orientation of the housing 110 such that the post 150 may not rotate in the opening 166 of the sheet metal 160. The post 150 and/or the tab 180 may be integrally formed as part of the housing 110, for example during a molding operation.

Figure 4:
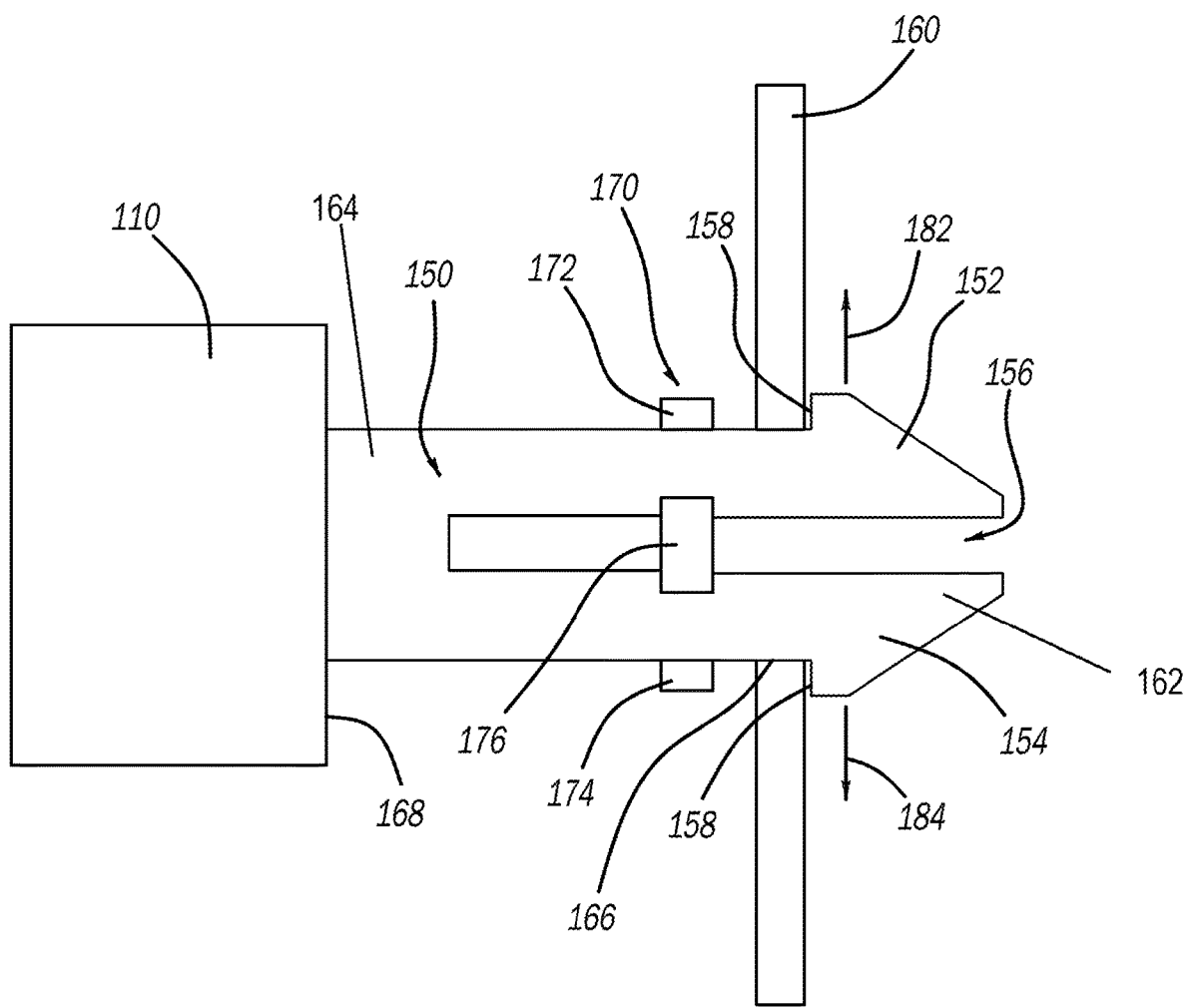
FIG. 4 is a schematic view of a sensor assembly with a spring clip for locking a mounting post.

FIG. 4 is a schematic view of the post being inserted through the sheet metal. As discussed above, a post 150 may extend from the housing 110. The post 150 may be a unitary piece and include a first portion 152 and a second portion 154 extending in parallel away from the housing 110. A gap 156 may extend between the first portion 152 and the second portion 154. Both the first portion 152 and the second portion 154 may include locking features 158 configured to engage the edges of the opening 166 in the sheet metal 160. For example, the tip 162 of the post 150 may have a larger diameter than a shaft portion 164 of the post 150, as shown in FIG. 3. As such, the locking feature 158 may be a step down in diameter of the post 150. Further, the tip 162 of the post 150 may be chamfered to allow ease of centering when inserting the post 150 through the opening 166 in the sheet metal 160.

As the tip of the post 150 is inserted through the opening 166 of the sheet metal 160, the first portion 152 and the second portion 154 may deflect towards each other to close the gap 156 allowing the tip 162 with the larger diameter to be inserted through the opening 166 in the sheet metal 160. Once the tip 162 of the post 150 is extended fully through the opening 166 in the sheet metal 160, the first portion 152 and the second portion 154 may deflect outwardly away from one another, as denoted by arrows 182 and 184, thereby locking the post 150 in the opening 166 of the sheet metal 160. To prevent further inward deflection of the first portion 152 with respect to the second portion 154, the clip 170 may include a plunger 176 that extends into the gap 156. The plunger 176 may fill the gap 156 and provide an outward deflection force on the first portion 152 relative to the second portion 154. In addition, the clip 170 may include outer retention arms 172, 174 that extend around the outer diameter of the shaft portion of the post 150. The outer retention arms 172, 174 serve to lock the position of the clip 170 so that the clip 170 may not be easily or unintentionally removed from the post 150.

Figure 5:
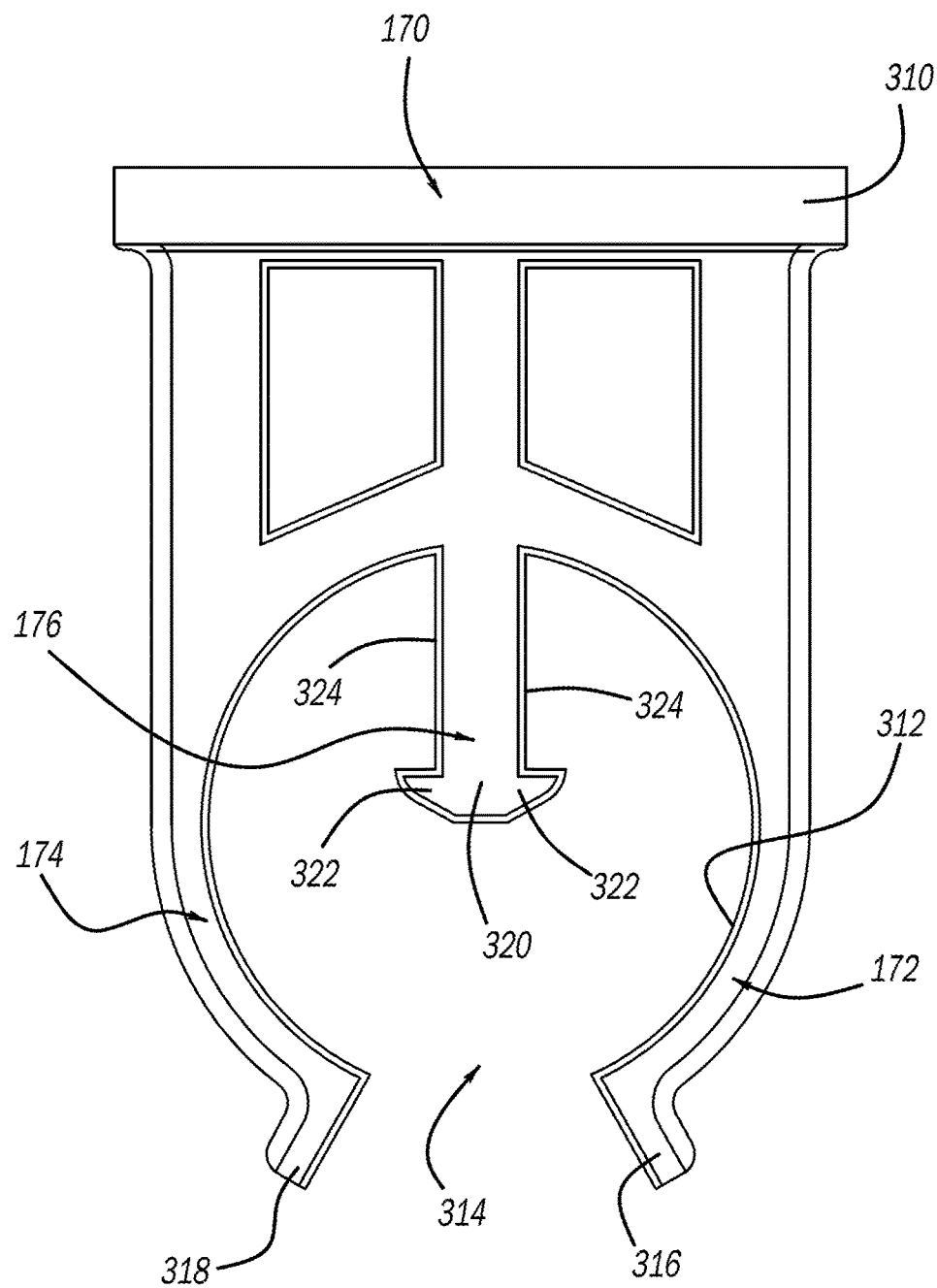
FIG. 5 is a front view of a spring clip for locking a mounting post of a sensor assembly.

FIG. 5 is a front view of the clip 170. The clip 170 includes a first outer retention arm 172 and a second outer retention arm 174 that extend around the post. In some implementations, the first and second outer retention arms 172, 174 may have an inner surface 312 that conforms to and engages the outer surface of the post 150. The clip 170 may include an opening 314 to receive the post 150. The opening 314 may be smaller than the diameter of the post 150. As such, the first and second outer retention arms 172, 174 may deflect outwardly as the post 150 fits through the opening 314. To allow ease of insertion, the clip 170 may include a guiding finger 316 on the first outer retention arm 172 that is angled to guide the post 150 into the opening 314. Similarly, the second outer retention arm 174 may include a guiding finger 318 angled to guide the post 150 towards the opening 314. As such, the first outer retention arm 172 and the second outer retention arm 174 comprise guiding fingers 316, 316 that extend at an angle from the first outer retention arm 172 and second outer retention arm 174 to center the clip 170 on the mounting post 150. The guiding fingers 316, 318 may be symmetric and they may extend outwardly from the inner surface 312 to help center the clip 170 on the post 150.

The plunger 176 may extend from the inner surface 312 and be configured to extend into the gap 156 in the post 150. The plunger 176 may include a tip 320 that is rounded or chamfered to center the plunger 176 in the gap 156 of the post 150. The plunger 176 may include one or more barbs 322 having a width greater than the rest of the plunger 176. The barbs 322 may act as a locking mechanism to engage the post 150 and lock the clip 170 relative to the post 150. Further, the plunger 176 may include a ratcheting interface 324 along one or both sides of the plunger 176. The ratcheting interface 324 may interact with a ratcheting interface on a surface of the post 150 inside the gap 156. The clip 170 may also include a stopping shoulder 310 that may take the form of a bar across the top of the clip 170 to prevent over insertion and/or breaking of the clip 170 while being inserted. The expansion of the perimeter of the post 150 is caused by the plunger 176 engaging the interior of the mounting post 150 to maintain at least a minimum dimension of the gap.

Figure 6:
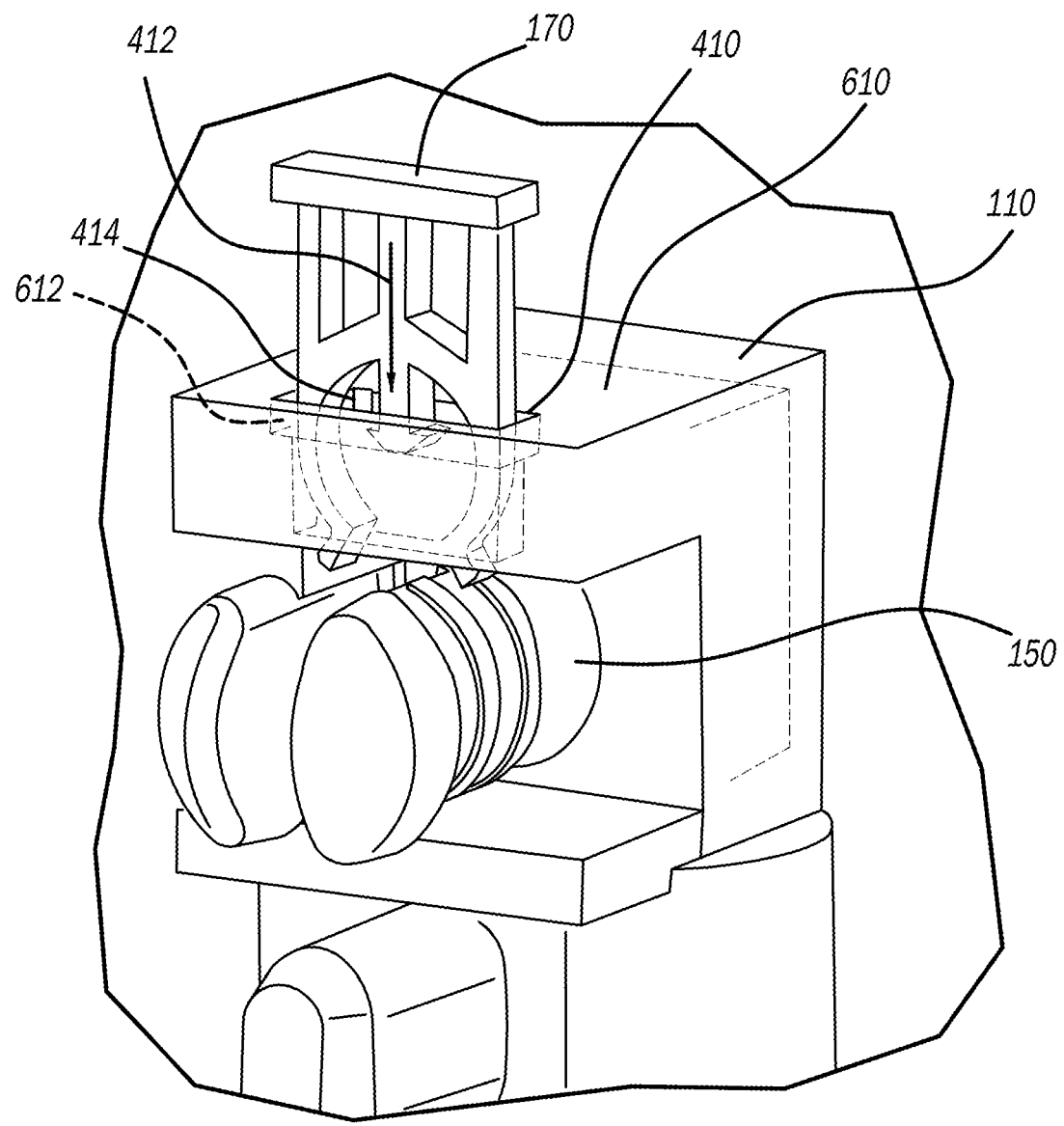
FIG. 6 is a perspective view illustrating insertion of the spring clip for locking the mounting post.

FIG. 6 illustrates insertion of the clip 170. The clip 170 may be inserted onto the post 150 through a slot 410 in the housing 110. The arrow 412 illustrates the motion of the clip 170 as it passes through the slot 410 and begins to interact with the post 150. A key 414 may be used to restrict the orientation in which the clip 170 may be inserted. As such, the slot 410 may be designed such that the clip 170 only fits through the slot 410 in one orientation. A shoulder feature 612 in the slot 410 can aid the operator in determining if the clip 170 is fully inserted. For example, if the clip 170 is flush with the top surface 610, the insertion may be proper. Further, a shoulder 310 in the clip 170 may interfere with the slot 410 to prevent over insertion.

Figure 7:
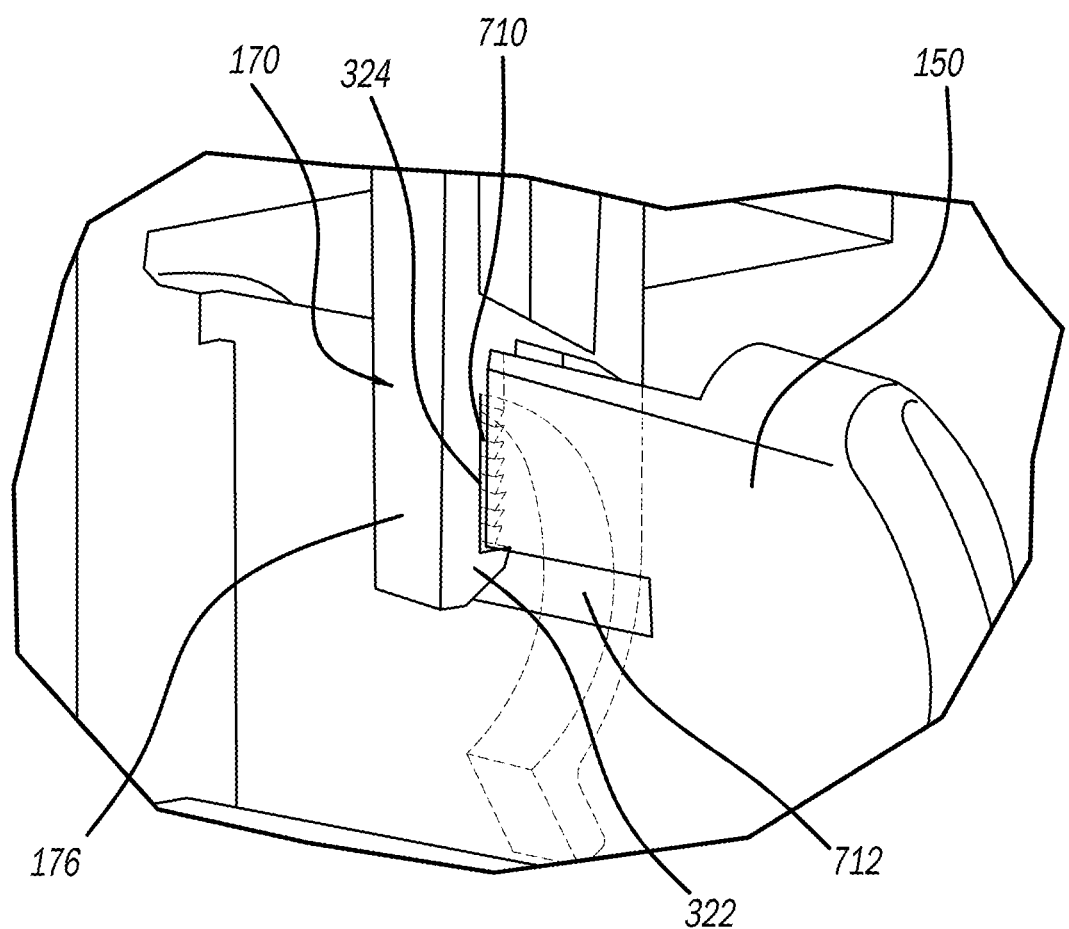
FIG. 7 is a section perspective view illustrating the interaction of a spring clip and a mounting post of a sensor assembly.

FIG. 7 is a sectional view that illustrates one implementation of the ratcheting interface between the clip 170 and the post 150. The ratcheting interface 324 on the plunger 176 may engage a ratcheting interface 710 on a surface of the post 150 inside the gap. The ratcheting interfaces 324 and 710 may include a plurality of fingers and barbs that slide across one another and lock the position of the plunger relative to the post as each finger slips over each barb. The barbs may be stationary and solid. The fingers may be attached at one end and free on an opposite end allowing the fingers to deflect as they pass over the barbs in one direction and lock against the barbs in the opposite direction. As such, the holding force can be increased as the plunger 170 is inserted further into the gap and more fingers interact with more barbs between the ratcheting interfaces 324 and 710. In addition, the barb 322 is shown engaging a pocket 712 in the inner surface of the post 150 within the gap.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

What is claimed is:

1. A mountable sensor assembly for mounting on sheet metal of a vehicle assembly, the sheet metal having an opening for mounting the mountable sensor assembly, the mountable sensor assembly comprising:
   a sensor;
   a housing comprising a cavity that receives the sensor, the housing having a mounting surface and a mounting post extending from the mounting surface, the mounting post having a gap; and
   a clip configured to lock onto the mounting post and extend into the gap to expand a perimeter of the mounting post to lock the mounting post to the sheet metal;
   wherein the clip extends radially into the gap of the mounting post.

2. The assembly of claim 1, wherein the gap divides the post into at least two sections.

3. The assembly of claim 1, wherein the post includes a shaft and a tip at an end of the shaft, the tip having a diameter that is greater than a diameter of the shaft.

4. The assembly of claim 1, wherein the clip includes a plunger that is inserted into the gap in the mounting post to expand the perimeter of the mounting post.

5. The assembly of claim 4, wherein the plunger includes a locking feature that engages an inner surface of the mounting post.

6. The assembly of claim 5, wherein the locking feature is a barb that engages a pocket in the inner surface of the mounting post.

7. The assembly of claim 1, wherein the clip includes a first arm and a second arm that extend around the perimeter of the post.

8. The assembly of claim 7, wherein the first arm and the second arm comprise guiding fingers that extend at an angle from the first and second arm to center the clip on the mounting post.

9. The assembly of claim 1, wherein the clip extends through the mounting post.

10. A mountable sensor assembly for mounting on sheet metal of a vehicle assembly, the sheet metal having an opening for mounting the mountable sensor assembly, the mountable sensor assembly comprising:
    a sensor;
    a housing comprising a cavity that receives the sensor, the housing having a mounting surface and a mounting post extending from the mounting surface, the mounting post having a gap; and
    a clip configured to lock onto the mounting post and extend into the gap to expand a perimeter of the mounting post to lock the mounting post to the sheet metal, the clip including a plunger;
    wherein the plunger includes a locking feature that engages an inner surface of the mounting post;
    wherein the plunger includes a ratcheting interface that engages a ratcheting interface on an inner surface of the mounting post.

11. A mountable sensor assembly for mounting on sheet metal of a vehicle assembly, the sheet metal having an opening for mounting the mountable sensor assembly, the mountable sensor assembly comprising:
    a sensor;
    a housing comprising a cavity that receives the sensor, the housing having a mounting surface and a mounting post extending from the mounting surface, the mounting post having a gap that divides the mounting post into at least two portions, the mounting post includes a shaft and a tip at an end of the shaft, the tip having a diameter that is greater than a diameter of the shaft; and
    a clip configured to lock onto the mounting post and extend into the gap to expand a perimeter of the mounting post to lock the mounting post to the sheet metal;
    wherein the clip extends through the mounting post.

12. The assembly of claim 11, wherein the clip includes a plunger that is inserted into the gap in the mounting post to expand the perimeter of the mounting post.

13. The assembly of claim 12, wherein the plunger includes a locking feature that engages an inner surface of the mounting post.

14. The assembly of claim 13, wherein the locking feature is a barb that engages a pocket in the inner surface of the mounting post.

15. The assembly of claim 12, wherein the plunger includes a ratcheting interface that engages a ratcheting interface on an inner surface of the mounting post.

16. The assembly of claim 11, wherein the clip includes a first arm and a second arm that extend around the perimeter of the post.

17. The assembly of claim 16, wherein the first arm and the second arm comprise guiding fingers that extend at an angle from the first and second arm to center the clip on the mounting post.

18. The assembly of claim 11, wherein the clip extends radially into the gap of the mounting post.

* * * * *